(No Model.)
S. H. PERCY.
SPROCKET CHAIN.
No. 503,871. Patented Aug. 22, 1893.
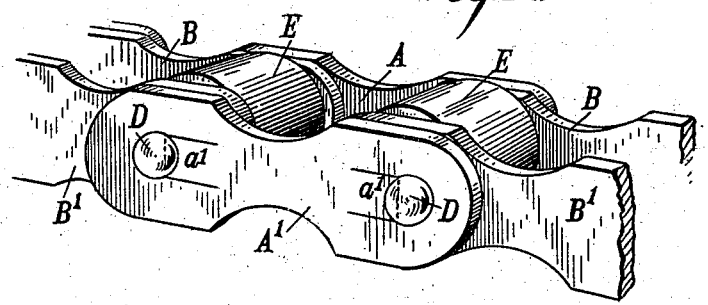
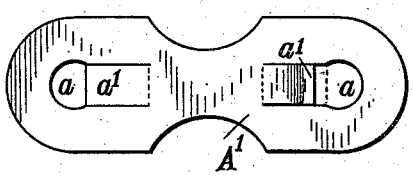
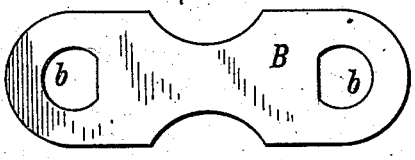
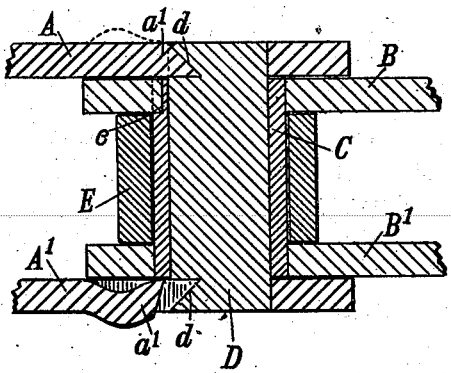
WITNESSES:
Frank Miller.
B. V. Woolley.
INVENTOR.
Sidney H. Percy
By his attorneys
King & Thurston

UNITED STATES PATENT OFFICE.

SEDNEY H. PERCY, OF CHICAGO, ILLINOIS.

SPROCKET-CHAIN.

SPECIFICATION forming part of Letters Patent No. 503,871, dated August 22, 1893.
Application filed January 25, 1893. Serial No. 459,648. (No model.)

*To all whom it may concern:*

Be it known that I, SEDNEY H. PERCY, a subject of the Queen of Great Britain, residing at Chicago, in the county of Cook and State of Illinois, have invented certain new and useful Improvements in Sprocket-Chains; and I do hereby declare the following to be a full, clear, and exact description of the invention, such as will enable others skilled in the art to which it appertains to make and use the same.

My invention relates to sprocket chains of the sort especially adapted for use as a part of the driving mechanism of safety bicycles, and for other analogous uses.

The object of the invention is to provide a chain which shall be extremely durable, and which will operate with very little friction; and the invention consists in the construction and combination of parts hereinafter described,—all of which will be definitely pointed out in the claim.

In the drawings, Figure 1 is a perspective view of a portion of a chain embodying my invention. Fig. 2 is a side elevation of one outer link. Fig. 3 is a side elevation of an inner link; and Fig. 4 is a longitudinal sectional view through one of the joints of the chain.

Referring to the parts by letter, A A' represent two parallel links which constitute one division of the chain; and B B' represent two parallel links which are pivoted to said links A A', and constitute an adjacent division of the chain.

C represents a sleeve, and D the pivot which is rotatable in said sleeve and projects from both ends thereof. In the inner links B B', the holes $b$ are formed which fit over the ends of the sleeve C.

To produce the desired operation of the parts it is necessary to prevent the turning of the sleeve in the holes in the said links, and this result is attained by making the ends of the sleeve, which lie in the links, of some irregular form, as for example, the form which results from flattening or grinding away a portion of the otherwise cylindrical surface of the sleeve as at $c$, and to make the holes in the links of corresponding shape.

In the projecting ends of the pivot D the notches $d\ d$ are formed. In the links A A the holes $a\ a$ are made,—the said holes being of such shape that they are adapted to fit around the notched part of said pivot.

$a'\ a'$ represent tongues which are integral with the link and retain their connection therewith at one end. The loose ends of the tongues begin at the holes, and when they are formed in a press or in any other suitable machine, they are bent back so as to enlarge the holes $a$ and permit the passage therethrough of the ends of said pivot, as shown at the right of Fig. 2 and the lower part of Fig. 4. When the links A A' embrace the ends of the pivot these tongues are straightened out thereby forcing their ends into the notches $d\ d$, and rigidly connecting the links and pivot. When so connected, the wearing surface of the chain joint is as long as the sleeve C and since the wearing surfaces are hardened, the joint is extremely durable.

E represents a friction roller which is mounted on the sleeve C and lies between the two links B B'. It should likewise be made of hardened steel, and is adapted to engage with the sprocket wheel, and thereby reduces the friction produced in the use of the chain.

Having thus described my invention, I claim—

The combination of a sleeve having irregularly shaped ends, links having correspondingly shaped holes into which said ends are inserted, with a pivot which passes through said sleeve and has transverse notches near its ends, links having holes adapted to fit said notched parts of the pivot, and having also integral tongues adapted to be bent back to enlarge the said holes to permit the insertion of the pivot and to be straightened out and forced into said notches, substantially as and for the purpose set forth.

In testimony whereof I affix my signature in presence of two witnesses.

SEDNEY H. PERCY.

Witnesses:
JOHN F. TURNER,
JAMES M. STEWART.